(12) United States Patent
Kriegl

(10) Patent No.: US 8,360,717 B2
(45) Date of Patent: Jan. 29, 2013

(54) BLADE OF A TURBOMACHINE

(75) Inventor: Bernd Kriegl, Olching (DE)

(73) Assignee: MTU Aero Engines GmbH, Munich (DE)

(*) Notice: Subject to any disclaimer, the term of this patent is extended or adjusted under 35 U.S.C. 154(b) by 1162 days.

(21) Appl. No.: 12/093,584

(22) PCT Filed: Nov. 8, 2006

(86) PCT No.: PCT/DE2006/001956
§ 371 (c)(1),
(2), (4) Date: May 13, 2008

(87) PCT Pub. No.: WO2007/054075
PCT Pub. Date: May 18, 2007

(65) Prior Publication Data
US 2008/0298976 A1    Dec. 4, 2008

(30) Foreign Application Priority Data
Nov. 14, 2005 (DE) .......................... 10 2005 054 172

(51) Int. Cl.
*F01D 5/14* (2006.01)

(52) U.S. Cl. ..... 415/200; 416/221; 416/224; 416/241 R; 416/248; 29/889.21; 29/889.22

(58) Field of Classification Search .................. 415/200; 416/204 R, 219 R, 220 R, 221, 241 R, 224, 416/223 R, 248; 29/889.21, 889.22
See application file for complete search history.

(56) References Cited

U.S. PATENT DOCUMENTS

| 4,417,854 | A |   | 11/1983 | Cain et al. |
| 5,160,243 | A | * | 11/1992 | Herzner et al. ........... 416/220 R |
| 6,270,318 | B1 | * | 8/2001 | Shah et al. ................ 416/193 A |
| 6,751,863 | B2 | * | 6/2004 | Tefft .......................... 29/889.21 |

FOREIGN PATENT DOCUMENTS

| CH | 423 431 | 10/1966 |
| DE | 886 676 | 8/1953 |
| EP | 0 412 397 B1 | 2/1991 |
| EP | 1 306 454 B1 | 5/2003 |
| WO | WO 96/41068 | 12/1996 |

OTHER PUBLICATIONS

European Office Action, dated May 16, 2011, 5 pages.
PCT/DE2006/001956 PCT/ISA/210.

* cited by examiner

*Primary Examiner* — Igor Kershteyn
(74) *Attorney, Agent, or Firm* — Crowell & Moring LLP

(57) ABSTRACT

A blade of a turbomachine, in particular of a gas turbine, is disclosed. The blade includes at least one fastening section for fastening the same in a locating section of a rotor-side or stator-side component of the turbomachine. The, or each, fastening section has a core region which is made of a relatively brittle and relatively light material and is embedded in an encasing region made of a material having relatively high ductility.

33 Claims, 1 Drawing Sheet

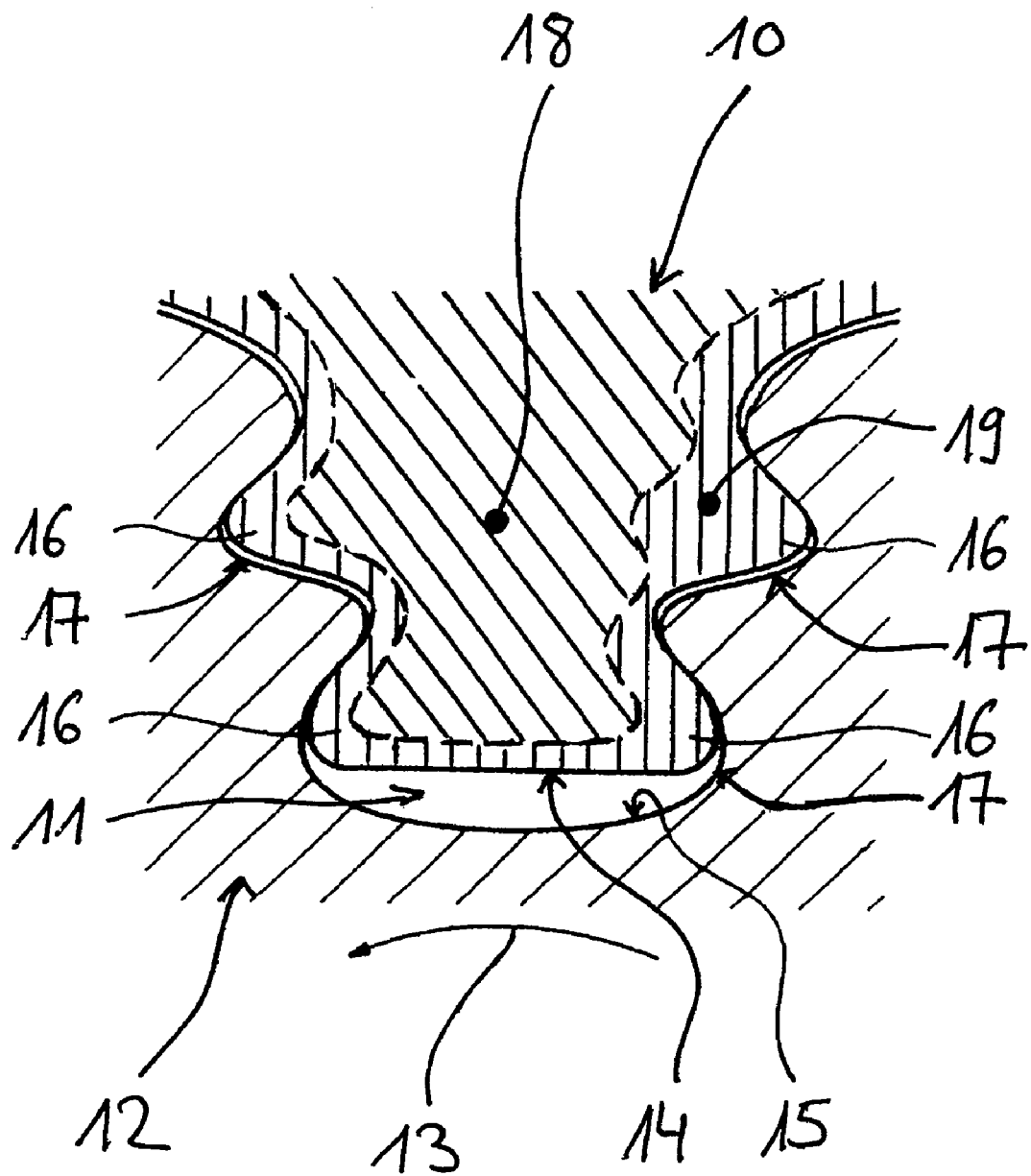

BLADE OF A TURBOMACHINE

This application claims the priority of International Application No. PCT/DE2006/001956, filed Nov. 8, 2006, and German Patent Document No. 10 2005 054 172.0, filed Nov. 14, 2005, the disclosures of which are expressly incorporated by reference herein.

BACKGROUND AND SUMMARY OF THE INVENTION

The invention relates to a blade of a turbo machine, in particular a gas turbine.

Modern gas turbines, particularly aircraft engines, must do justice to the highest requirements with respect to reliability, weight, performance, cost-effectiveness and service life. In the development of gas turbines, the material selection, the search for new, suitable materials as well the search for new fabrication methods, among other things, play a crucial role. The most important materials that are used nowadays for aircraft engines or other turbomachines are titanium alloys and high-strength steels. The high-strength steels are used for shaft parts, transmission parts, the compressor housing and the turbine housing. Titanium alloys are typical materials for compressor parts. Nickel alloys are suitable for the hot turbine parts.

As a rule, gas turbines encompass several rotating rotor blades as well as several stationary guide vanes, whereby the rotor blades rotate along with a rotor, and whereby the rotor blades as well as the guide vanes are enclosed in a stationary housing. To increase performance, it is important for all components and subsystems to be optimized. To increase the degree of efficiency of gas turbines, it is desirable to design particularly the rotor blades as well as the guide vanes to be lighter, i.e., having a lower weight. However, light materials have relatively low ductility and furthermore are relatively brittle, whereby in the case of high localized stresses, which are common on the blades, an overload and thus failure of the materials or of the blades can arise. As a result, it has not been possible in practice until now to fabricate the blades from light materials, whereby ultimately the degree of efficiency and therefore increased performance of the gas turbines are limited.

Thus, the present invention is based on the objective of creating a novel blade of a turbomachine.

According to the invention, the, or each, fastening section has a core region which is made of a relatively brittle and relatively light material and is embedded in an encasing region made of a material having relatively high ductility.

The invention makes it possible to use light as well as brittle materials for fabricating blades. According to the invention, the core region of the fastening section of the blade is manufactured of the light as well as brittle material, whereby the core region is embedded in an encasing region, which is fabricated of a material having high ductility. Due to the encasing of the core region, it is possible to avoid overloads on contact surfaces between an outer contour of the fastening section and an inner contour of a locating section for the fastening section itself in the case of high localized loads.

By using light as well as brittle materials for the blades, it is possible for the first time with the present invention to realize enormous savings in terms of weight. This results in an optimization of the degree of efficiency and thus in an increase in performance.

BRIEF DESCRIPTION OF THE DRAWING

Preferred developments of the invention are yielded from the following description. Without being limited hereto, exemplary embodiments of the invention are explained in greater detail on the basis of the drawing. The drawing shows:

FIG. 1 is a schematic cross section through a fastening section embodied as a blade footing of an inventive blade embodied as a rotor blade of a turbomachine along with a rotor.

DETAILED DESCRIPTION OF THE DRAWING

The invention will be explained in greater detail in the following, making reference to FIG. 1, whereby FIG. 1 shows a cross section through a blade footing of a rotor blade. Reference is already made at this point that the invention is not limited to use in rotating rotor blades, and in fact can also be used in an analogous manner on stationary guide vanes.

FIG. 1 shows a schematic cross section through a fastening section 10 embodied as a blade footing of a gas turbine rotor blade, whereby the fastening section 10 of the gas turbine rotor blade is positioned in a locating section 11 of a rotor 12. During operation, the gas turbine blades rotate along with the rotor in the direction of the arrow 13 shown in FIG. 1.

The fastening section 10 of the gas turbine rotor blade has an outer contour 14 shaped like a Christmas tree, whereby an inner contour 15 of the locating section 11 is adapted to the outer contour 14 of the fastening section 10. The fastening section 10 with a contour shaped like a Christmas tree has projections 16, which engage in correspondingly contoured recesses 17 of the locating section 11.

In terms of the present invention, the fastening section 10 of the gas turbine rotor blade is made of two regions that are functionally separated from each other, namely a core region 18 and an encasing region 19 that encases the core region 18 on all sides. Consequently, the core region 18 is embedded in the encasing region 19.

According to the invention, the core region 18 of the fastening section 10 is made of a relatively brittle as well as relatively light material, which has relatively low ductility. Thus, the core region 18 can be made of a ceramic material or an intermetallic material. When the core region 18 is made of an intermetallic material, the core region is preferably made of a TiAl material.

According to the invention, the encasing region 19, in which the core region 18 is embedded, is made of a material having a relatively high ductility. The encasing region 19 may be made of a metallic material, which is adapted to the metallic material of the rotor 12, i.e., has a similar, but not identical, material composition as the rotor. Therefore, the encasing region 19 can be made for example of a nickel-based alloy or a cobalt-based alloy. In addition, the encasing region 19 can be made of a MCrAlY material.

The encasing region 19 of the fastening section 10 can also be fabricated of what is commonly known as aluminum bronze materials, which preferably have 4 to 8% by weight aluminum, 2 to 5% by weight chrome, 0 to 3.5% by weight iron as well copper in the remainder.

In the exemplary embodiment shown in FIG. 1, the encasing region 19 is embodied as a single layer or single ply. Alternatively, the encasing region can also be embodied to be multi-layered or multi-ply.

In the exemplary embodiment shown in FIG. 1, the encasing region 19 is embodied to be relatively thick and is applied to an outer contour of the core region 18 that is not true to the end contour. The encasing region 19 of the fastening section 10 is processed in such a way that the outer contour 14 thereof, which defines the outer contour of the fastening section 10, is adapted to the inner contour 15 of the locating region 11 of the rotor 12. In this case, the core region 18 of the fastening section 10, which is made of the relatively brittle as well as relative light material, can have any contour. The encasing region 19, which is made of a metallic material, can be adapted with commonly used processing methods to the desired final contour.

In contrast to this, it is also possible for the core region 18 to already have an outer contour that is true to the end contour, i.e., in terms of its dimensions, is reduced just by the thickness of the encasing region 19. In this case, the encasing region 19 is embodied to be relatively thin since processing thereof that is true to the end contour is not required in this case.

In the exemplary embodiment shown in FIG. 1, it was assumed that the fastening section 10 was a blade footing of a gas turbine rotor blade. As already mentioned, the invention is not limited, however, to the use on rotor blades, in fact the invention can also be used on stationary guide vanes. These types of stationary guide vanes may have several hook-like, flange-like or plug-like fastening sections, whereby then each fastening section of the stationary guide vanes is preferably embodied as described for a rotor blade making reference to FIG. 1.

It is possible with the invention to manufacture blades for turbomachines, in particular for gas turbine aircraft engines, of relatively light as well as relatively brittle materials. To avoid overloading these types of blades in the region of their fastening sections, core regions of the fastening sections, which are made of the relatively light as well as relatively brittle material, are embedded in encasing regions, which are made of materials having relatively high ductility. As a result, enormous weight savings and therefore increases in performance can be realized in turbomachines.

The invention claimed is:

1. A blade of a turbomachine, comprising a fastening section for fastening the section in a locating section of a rotor-side or stator-side component of the turbomachine, wherein the fastening section has a core region which is made of a relatively brittle and relatively light material and is embedded in an encasing region made of a material having relatively high ductility, wherein the encasing region is made of a MCrAlY material, and wherein the core region is made of an intermetallic material.

2. The blade according to claim 1, wherein the encasing region is embodied to be a single layer.

3. The blade according to claim 1, wherein the encasing region is embodied to be multi-layered.

4. The blade according to claim 1, wherein a relatively thick encasing region is applied to an outer contour of the core region that is not true to an end contour, which encasing region is processed in such a way that an outer contour thereof is adapted to an inner contour of the locating section of the rotor-side or the stator side component so that it is true to the end contour.

5. The blade according to claim 1, wherein the blade is embodied as a rotor-side rotor blade.

6. The blade according to claim 1, wherein the blade is embodied as a stator-side guide vane.

7. The blade according to claim 1, wherein the turbomachine is a gas turbine.

8. A blade of a turbomachine, comprising a fastening section for fastening the section in a locating section of a rotor-side or stator-side component of the turbomachine, wherein the fastening section has a core region which is made of a relatively brittle and relatively light material and is embedded in an encasing region made of a material having relatively high ductility, wherein the encasing region is made of a MCrAlY material, and wherein the core region is made of a TiAl material.

9. The blade according to claim 8, wherein the encasing region is embodied to be a single layer.

10. The blade according to claim 8, wherein the encasing region is embodied to be multi-layered.

11. The blade according to claim 8, wherein a relatively thick encasing region is applied to an outer contour of the core region that is not true to an end contour, which encasing region is processed in such a way that an outer contour thereof is adapted to an inner contour of the locating section of the rotor-side or the stator side component so that it is true to the end contour.

12. The blade according to claim 8, wherein the blade is embodied as a rotor-side rotor blade.

13. The blade according to claim 8, wherein the blade is embodied as a stator-side guide vane.

14. The blade according to claim 8, wherein the turbomachine is a gas turbine.

15. A blade of a turbomachine, comprising a fastening section for fastening the section in a locating section of a rotor-side or stator-side component of the turbomachine wherein the fastening section has a core region which is made of a relatively brittle and relatively light material and is embedded in an encasing region made of a material having relatively high ductility, wherein the encasing region is made of a MCrAlY material, and wherein an outer contour of the core region is adapted to an inner contour of the locating section of the rotor-side or the stator-side component in such a way that that the outer contour, reduced by a thickness of a relative thin encasing region, is true to an end contour.

16. The blade according to claim 15, wherein the encasing region is embodied to be a single layer.

17. The blade according to claim 15, wherein the core region is made of a ceramic material.

18. The blade according to claim 15, wherein the encasing region is embodied to be multi-layered.

19. The blade according to claim 15, wherein the blade is embodied as a rotor-side rotor blade.

20. The blade according to claim 15, wherein the blade is embodied as a stator-side guide vane.

21. The blade according to claim 15, wherein the turbomachine is a gas turbine.

22. A blade of a turbomachine, comprising:
a fastening section, wherein the fastening section is coupleable to a locating section of a rotor-side or stator-side component of the turbomachine, wherein the fastening section has a core region made of a relatively brittle and a relatively light material, wherein the core region is embedded in an encasing region made of a material having relatively high ductility, and wherein the encasing region is made of a MCrAlY material, and wherein an outer contour of the core region matches an outer contour of the encasing region.

23. The blade according to claim 22, wherein the core region is made of a ceramic material.

24. The blade according to claim 22, wherein the encasing region is a single layer.

25. The blade according to claim 22, wherein the encasing region includes multiple layers.

26. A blade of a turbomachine, comprising:
a fastening section, wherein the fastening section is coupleable to a locating section of a rotor-side or stator-side component of the turbomachine, wherein the fastening section has a core region made of a relatively brittle and a relatively light material, wherein the core region is embedded in an encasing region made of a material having relatively high ductility, and wherein the encasing region is made of a MCrAlY material, and wherein the core region is made of an intermetallic material.

27. The blade according to claim 26, wherein an outer contour of the core region does not match an outer contour of the encasing region.

28. The blade according to claim 26, wherein the encasing region is a single layer.

29. The blade according to claim 26, wherein the encasing region includes multiple layers.

30. A blade of a turbomachine, comprising:
a fastening section, wherein the fastening section is coupleable to a locating section of a rotor-side or stator-side component of the turbomachine, wherein the fastening section has a core region made of a relatively brittle and a relatively light material, wherein the core region is embedded in an encasing region made of a material having relatively high ductility, and wherein the encasing region is made of a MCrAlY material, and wherein the core region is made of a TiAl material.

31. The blade according to claim 30, wherein the encasing region is a single layer.

32. The blade according to claim 30, wherein the encasing region includes multiple layers.

33. The blade according to claim 30, wherein an outer contour of the core region does not match an outer contour of the encasing region.

* * * * *